US012060096B2

(12) United States Patent
Maringer

(10) Patent No.: US 12,060,096 B2
(45) Date of Patent: Aug. 13, 2024

(54) METHOD FOR DATA TRANSMISSION INSIDE A RAIL-BOUND TRAFFIC SYSTEM

(71) Applicant: Thales Management & Services Deutschland GmbH, Ditzingen (DE)

(72) Inventor: Daniel Maringer, Leonberg (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 0 days.

(21) Appl. No.: 17/807,138

(22) Filed: Jun. 16, 2022

(65) Prior Publication Data

US 2022/0306171 A1  Sep. 29, 2022

Related U.S. Application Data

(63) Continuation of application No. PCT/EP2020/086637, filed on Dec. 17, 2020.

(30) Foreign Application Priority Data

Dec. 23, 2019 (EP) .................................. 19219240

(51) Int. Cl.
*B61L 27/70* (2022.01)
*B61L 27/40* (2022.01)
*B61L 27/50* (2022.01)
*B61L 27/53* (2022.01)
(Continued)

(52) U.S. Cl.
CPC ............... *B61L 27/70* (2022.01); *B61L 27/40* (2022.01); *B61L 27/50* (2022.01); *B61L 27/53* (2022.01); *H04L 67/12* (2013.01); *B61L 15/0027* (2013.01)

(58) Field of Classification Search
CPC .......... B61L 27/70; B61L 27/53; B61L 27/40; B61L 27/50; B61L 1/16; B61L 5/12
See application file for complete search history.

(56) References Cited

U.S. PATENT DOCUMENTS 5,420,883 A * 5/1995 Swensen ............... G01S 5/0009
375/138
2010/0029209 A1   2/2010 Daum et al.
(Continued)

FOREIGN PATENT DOCUMENTS

CN        102063796 B    6/2013
CN        103795791 A    5/2014
(Continued)

OTHER PUBLICATIONS

Ansaldo STS., "Wayside Train Separation", Lineside Electronic UnitLEU-2G, Generic Product Catalog, 94 pages.
(Continued)

*Primary Examiner* — Zachary L Kuhfuss
(74) *Attorney, Agent, or Firm* — Orbit IP

(57) ABSTRACT

A method for data transmission inside a rail-bound traffic system has of a plurality of field elements, in which the data transmission takes place via a flexible wireless transmission path between a sender field element and a control unit along available field elements. A data transmission system is for application of the method and a rail-bound traffic system having such a data transmission system. Furthermore, there is use of communication units on field elements of a rail-bound traffic system to form the data transmission system.

15 Claims, 4 Drawing Sheets

(51) Int. Cl.
   *H04L 67/12* (2022.01)
   *B61L 15/00* (2006.01)

(56) References Cited

U.S. PATENT DOCUMENTS

| | | | |
|---|---|---|---|
| 2010/0265815 A1* | 10/2010 | Riemer | B61L 27/30 |
| | | | 370/216 |
| 2016/0016596 A1 | 1/2016 | Naylor | |
| 2016/0105218 A1* | 4/2016 | Henry | B61L 27/70 |
| | | | 455/523 |
| 2017/0349193 A1 | 12/2017 | Fischer | |
| 2018/0222505 A1* | 8/2018 | Chung | B61L 27/14 |
| 2018/0319414 A1* | 11/2018 | Lefebvre | B61L 25/025 |
| 2019/0291758 A1* | 9/2019 | Tsuchida | B61L 27/70 |
| 2019/0380170 A1* | 12/2019 | Bode | H04B 10/1143 |
| 2020/0396794 A1 | 12/2020 | Bro et al. | |

FOREIGN PATENT DOCUMENTS

| | | |
|---|---|---|
| CN | 104639617 A | 5/2015 |
| CN | 106658565 A | 5/2017 |
| DE | 10 2011 003 364 A1 | 8/2012 |
| DE | 10 2018 202 638 A1 | 8/2019 |
| JP | 2000-233750 A | 8/2000 |
| WO | 2016/102159 A1 | 6/2016 |

OTHER PUBLICATIONS

Fritz, Christian, "Intelligent Point Machines", Signal & Draht: Signalling & Data Communication, vol. 110, No. 12, Dec. 2018, 5 pages.

Lin et al., "UWB. Multi-sensors and Wifi-Mesh based PrecisionPositioning for Urban Rail Traffic", IEEE, 2010, 8 pages. DOI: 10.1109/upinlbs.2010.5654041.

Yun et al., "A Study on the Development of the Train Control SystemData Transmission Technology Using a Wireless Mesh", Third International Conference on Multimedia Information Networking and Security, IEEE, 2011, 196-200, DOI: 10.1109/MINES.2011.96.

* cited by examiner

METHOD FOR DATA TRANSMISSION INSIDE A RAIL-BOUND TRAFFIC SYSTEM

CROSS-REFERENCE TO RELATED APPLICATIONS

This continuation application claims priority to PCT/EP2020/086637 filed on Dec. 17, 2020 which has published as WO 2021/130095 A1 and also the European application number 19219240.9 filed on Dec. 23, 2019, the entire contents of which are fully incorporated herein with these references.

FIELD OF THE INVENTION

The invention relates to a method for data transmission inside a rail-bound traffic system having a first field element having a communication unit and at least one further field element having a further communication unit, the data transmission taking place along a transmission path between the first field element and a control unit of the rail-bound traffic system.

BACKGROUND OF THE INVENTION

Field elements serve to monitor and control rail traffic within rail-bound traffic systems.

Conventional field elements have data lines for data transmission, which, however, have to be laid in a complicated manner. In individual cases, in particular in inaccessible portions of the traffic system, the field elements at best have a transmitting and receiving unit that communicates with a mobile radio station via an integrated mobile radio module. In predetermined transmission periods, the field elements transmit application-specific data via a mobile radio connection to the mobile radio station of a control center and receive instructions from the mobile radio station.

Field elements equipped in this way are known, for example, from [1] and [3].

However, the field elements must be integrated into an existing mobile network using fee-based mobile radio modules and contracts. If there is no network coverage, no data transmission can take place through the existing mobile network. This is, in particular, the case in tunnels and in rural areas. If the connection is disrupted, no data transmission can be carried out and, as a result, the work of specialists on site is required in most cases.

[4] and [5] describe communication between radio elements arranged on the track side and passing trains. The connection is established within the signal range to the radio elements arranged on the track side. Cables and fiber optic lines are used to connect the radio elements on the track side, which entails considerable effort and costs.

[2] describes a wireless network of an intelligent traffic control system. The network subscribers are designed to send information to the other network participants in order to improve control. The network subscribers can be reached at any time by the other network subscribers and can communicate directly with each other. Provision is not made for bypassing disruptions, which leads to delays in data transmission.

SUMMARY OF THE INVENTION

Object of the Invention

The object of the invention is to provide a network that is flexible with regard to the transmission path for cost-effective data transmission between existing field elements of a rail-bound traffic system, in which network data can be transmitted despite disruptions to the transmission path.

Description of the Invention

The object is achieved according to the invention by a method of the type mentioned at the outset, characterized in that the transmission path was determined as a function of the availability of the further field elements, and in that the data transmission takes place via at least one of the further field elements, and in that the data is transmitted wirelessly between the field elements.

As a result, a high level of flexibility is achieved when selecting the transmission path, which is particularly advantageous for avoiding disruptions in the rail-bound traffic system.

The transmission of data between the field elements of the rail-bound traffic system is wireless. As a result, no data line is required between the field elements, which allows cost-effective installation and simple integration of new field elements. The integration of the control unit into the network of field elements of the rail-bound traffic system can take place wirelessly and/or via a data line.

In the following, the transmission path is understood to mean the transmission of data via field elements of the rail-bound traffic system from the first field element (sender field element) to the control unit and/or from the control unit to a last field element (receiver field element). The number of intermediate field elements on the transmission path is dependent on the individual course of the transmission path via the field elements of the rail-bound traffic system and the local spacing of the first field element or last field element from the control unit. The flexibility in determining or selecting the transmission path increases with an increasing number of field elements in the rail-bound traffic system.

According to the invention, the data transmission takes place between different field elements of the rail-bound traffic system. Thus, communication units can be used that have a shorter range than mobile radio transmitters. The data is passed on for transmission from field element to field element. Existing field elements can be retrofitted with communication units, such that the method according to the invention can also be carried out with existing systems.

The transmission path comprises the first field element and at least one further field element. The transmission path is formed only along field elements that are available at the time the transmission path is determined. The availability of the field elements is dependent on the signal range of the adjacent field elements, temporary and/or permanent disruptions of the signal between the adjacent field elements and the utilization of the field elements.

Permanent disruptions of the signal between adjacent field elements are caused, for example, by the landscape and/or buildings, in particular tunnels, which lead to a strong weakening of the signal strength. Intermittent disruptions are limited in time and are caused, for example, by weather conditions, technical defects in field elements, a high transmission volume with associated data congestion, transmission bans and trains located in the transmission path, in particular freight trains, which can lead to severe restrictions on data transmission. The list is not exhaustive but only of exemplary character.

To determine a transmission path along available field elements, the first field element sends an availability query to all adjacent field elements that can be reached at this point in time. When the availability query is answered by the adjacent field elements, these field elements are categorized as available in the first field element.

If an availability query is not answered by an adjacent field element, said field element cannot be considered for data transmission and is categorized as unavailable. In principle, different categorization and a different logic for determining availability are conceivable, for example through explicit reporting of the availability or non-availability by the adjacent field elements.

In one, in particular a plurality of, further steps, the availability query is passed on from the adjacent field elements to the adjacent field elements thereof and the control unit, which in turn react to the availability query. In particular, the availability query is passed on by the rail-bound traffic system until no new field elements have confirmed their availability.

In addition, at least one field element must confirm the availability of the control unit and/or the data connection to the control unit. The availability of the field elements and the control unit is transmitted to the first field element, which determines at least one transmission path along the available field elements of the network to the control unit.

In particular, the availability query from all field elements and the control unit is used to determine at least one transmission path between each possible first field element (each possible sender field element) to the control unit, or at least one transmission path from the control unit to each possible last field element (every possible receiver field element). A plurality of transmission paths are particularly preferably determined by the field elements and the control unit to be able to fall back on alternative transmission paths particularly quickly in the event of intermittent disruptions.

Alternatively or additionally, it can be provided that the availability of adjacent field elements and of the control unit is checked by means of the availability queries and the availability is only known to the adjacent field elements. As a result, a transmission path from the first field element (sender field element) to the control unit, or from the control unit to the last field element (receiver field element), is composed of partial transmission paths between adjacent field elements, the entire transmission path being unknown the first field element or the control unit.

The at least one determined transmission path can have a time-limited validity in order to force the availability query to be performed regularly. This ensures that the at least one transmission path along the available field elements is up-to-date.

The data transmission between a first field element (sender field element) and the control unit, or between the control unit and a last field element (receiver field element) takes place in an undisturbed case via the at least one determined transmission path.

The control unit represents a central node of the rail-bound traffic system and is designed to receive data from the field elements and/or to send data to the field elements. In this way, for example, the software status of a field element can be queried and optionally updated by means of remote maintenance. The control unit can be connected wirelessly and/or by means of a data line to at least one field element of the network of field elements.

In particular, the control unit can form the central node for a plurality of networks of field elements.

A further development of the method according to the invention is preferred, in which an autonomous ad hoc network is set up for data transmission between the field elements. The communication connection between the field elements of the transmission path is set up on demand when data is to be transmitted. The field elements form radio nodes of the ad hoc network. The field elements connect to each other independently.

If a disruption occurs that prevents data transmission along the at least one determined transmission path, the field element immediately upstream of the disruption in the determined transmission path sends feedback to the first field element (sender field element) or to the control unit. In other words, the link (field element) of the transmission chain (transmission path) last reached during the transmission of the data reports back the disruption in the transmission path to the first field element (sender field element) or to the control unit. If a further transmission path was determined during the availability query, the data can be transmitted along the further determined data transmission path.

In particular, it can be provided that the field element located immediately upstream of the disruption uses a transmission path determined during the availability query itself for the further transmission of the data to the control unit. Particularly preferably, the field element located immediately upstream of the disruption then informs the first field element (sender field element) of the changed transmission path, which the first field element (sender field element) stores as an alternative transmission path.

Furthermore, it can be provided that the field element located immediately upstream of the disruption sends the data to at least one field element that is located in the (original) transmission path upstream of the field element located immediately upstream of the disruption if the data is not transmitted, in particular on an alternative transmission path, and forwards the data via at least one transmission path determined during the availability query. In particular, this procedure can be repeated until the data is returned back to the first field element (sender field element).

Alternatively or additionally, it can be provided that the first field element (sender field element) sends a new availability query to the network of field elements and at least one new transmission path along available field elements is determined. This allows particularly simple and quick bypassing of disruptions.

A further development of the method according to the invention is also possible, in which a transmission path is determined for each data transmission.

A data transmission according to the invention is understood to mean a coherent data packet that can be transmitted as a unit. In this case, it can be provided that data to be transmitted is divided into a plurality of data packets and sent individually by the first field element (sender field element) and/or the control unit. This allows large amounts of data to be sent in packets and reassembled into a single unit by the receiver.

In this case, provision can be made for an availability query to be sent before each data transmission by a field element or by the control unit, and for a transmission path to be determined along available field elements. Transmission of data comprising a plurality of data packets can be carried out via a single transmission path or via a plurality of transmission paths. As a result, temporary disruptions can be avoided particularly effectively.

In particular, it can be provided that the at least one transmission path is determined taking into account additional decision criteria. Additional decision criteria are, for example, data size and/or data importance. The list is not to be understood as exhaustive. For example, provision can be made to transmit large amounts of data via available field elements that are less busy in terms of data traffic and/or to transmit data packets having high importance via a transmission path of available field elements that is as short and fast as possible. In particular, it is conceivable to optimize the determined transmission path with regard to a minimum number of communication partners or a minimum number of field elements located on the transmission path.

A particularly preferred further development of the method according to the invention provides that, during the data transmission, the availability of the field elements is checked, in particular at regular time intervals, and the determined transmission path is changed if one of the field elements over which the previously determined transmission path runs is no longer available. In this case, it is particularly advantageous not to send an availability query to the network of field elements because only the available field elements along the determined transmission path are queried to confirm their availability.

A further development of the method according to the invention is also preferred, in which the first, in particular all, field elements are designed to receive instructions. Instructions from the control unit can thus be transmitted to the field elements in a particularly advantageous manner. For example, a diagnostic process can be started, a point position can be changed and/or a signal can be switched by means of remote access. The list is not to be understood as exhaustive.

In a special further development of the method according to the invention, it is provided that the first field element determines the availability of the adjacent field elements, in particular all field elements, by receiving status messages and/or by means of the signal strength of the other field elements. It can be provided here that the field elements send status messages at least regularly, in particular permanently, to inform the adjacent field elements of the status of their availability.

Alternatively or additionally, a status message can be provided by temporarily activating an otherwise predominantly inactive field element, in particular by detecting the signal strength of the field element. In the case of a plurality of predominantly inactive field elements, provision can also be made for an instruction to briefly activate (wake up) the adjacent inactive field elements when a field element is activated and/or in the event of an availability query, in order to determine their availability.

In a preferred further development of the method according to the invention, it is provided that the state, in particular diagnostic data, of the first field element is transmitted to the control unit by means of the data transmission.

The data transmitted via the network of field elements can differ depending on the type of field element. In general, the method is suitable for the transmission of any data. However, in the area of application of rail-bound traffic systems, measurement data and diagnostic data from field elements represent a large part of the transmitted data volume. Measurement data includes, for example, temperatures, pressures, axle numbers, etc. Diagnostic data includes, for example, software versions, hardware versions, configuration data versions, internal status information about the field element, information about hardware errors in the field element, in particular faulty cable connections, and information about automatic restarts. The list is not to be understood as exhaustive.

A further development of the method according to the invention is also preferred in which only the field elements located on the transmission path communicate with one another for data transmission. This favors the lowest possible utilization of the field elements by means of minimal data traffic.

The object on which the invention is based is also achieved by a data transmission system of a rail-bound traffic system for executing a method according to the invention having a first field element and a communication unit connected via an interface to said field element, at least one further field element having a further communication unit and a control unit, the communication units and the control unit being designed to send and receive information, characterized in that the communication units are designed to determine a suitable transmission path along the available communication units from and/or to the control unit.

The field elements are configured via the communication units to answer availability queries from adjacent field elements and to send their own availability queries.

The data transmission system comprises in particular a network of 2 to 20, in particular 20 to 100, particularly preferably 100 to 1000 field elements and a control unit. The field elements of the data transmission system are arranged inside the network of field elements, in particular spatially separated, in such a way that at least two adjacent field elements—in particular in the disruption-free state—can exchange data both directly with one another and directly and/or indirectly with the control unit. In other words, a transport system consists of field elements when each field element of the network can communicate directly or via other field elements with every other field element of the network and the control unit.

Field elements in the sense of a rail-bound traffic system are track-side facilities such as points, signals, track-side electronics, axle counters, etc. The list is not to be understood as exhaustive.

An embodiment of the transmission system according to the invention is preferred in which the communication units are configured to set up an ad hoc network. The communication units can therefore react flexibly to impairments, in particular disruptions, in the transmission path and determine an alternative transmission path.

Furthermore, an embodiment of the transmission system according to the invention is preferred in which at least one of the communication units has an interface that is designed to transmit information from the field element, in particular diagnostic data, to the communication unit.

An embodiment of the transmission system according to the invention is particularly preferred in which the interface is designed to transmit information, in particular control instructions, from the communication unit to the field element. This allows the field element to be controlled and monitored via the control unit.

In a preferred further development of the transmission system according to the invention, it is provided that at least one of the communication units is designed to be supplied with energy via the energy supply of the associated field element. As a result, the communication module does not need its own power supply.

A particularly preferred embodiment of the transmission system according to the invention has at least one mobile control unit having a communication unit that is designed to communicate with field elements of the rail-bound traffic system. In particular, maintenance can thus be carried out particularly easily by a specialist via the control unit and/or the mobile control unit.

The object on which the invention is based is also achieved by a rail-bound traffic system having a data transmission system according to the invention.

Furthermore, the object on which the invention is based is achieved by using communication units designed for wireless data transmission to field elements of a rail-bound traffic system, for data transmission between a field element and a control unit along a transmission path of available field elements, the communication unit determining the availability of the field elements, and the field elements on the transmission path communicating wirelessly with one another via their communication units.

Further advantages of the invention can be found in the description and the drawings. Likewise, according to the invention, the aforementioned features and those which are to be explained below can each be used individually or together in any desired combinations. The embodiments shown and described are not to be understood as an exhaustive list, but rather have exemplary character for the description of the invention.

BRIEF DESCRIPTION OF THE DRAWINGS

Detailed Description of the Invention and Drawings

Figure 1:
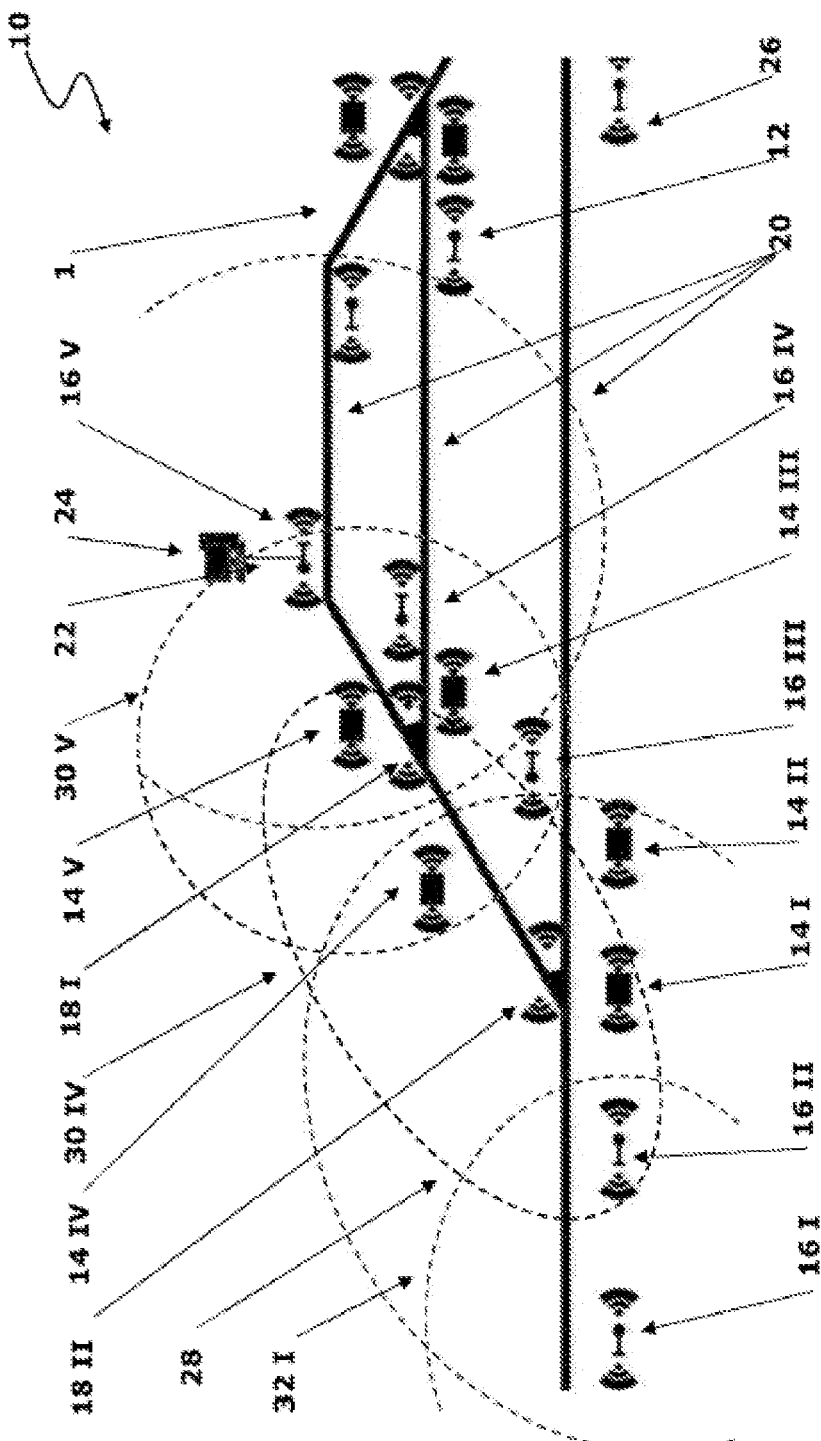
Figure 2:
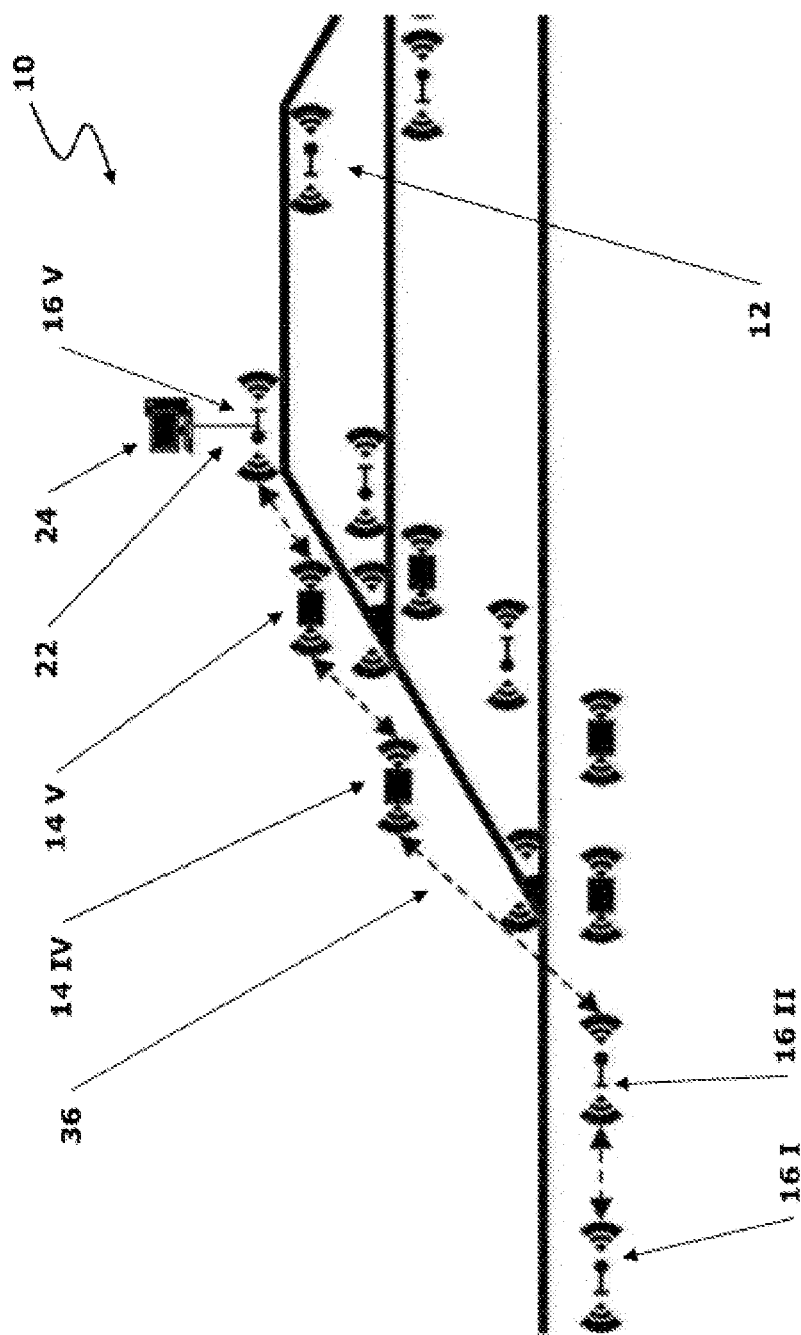
Figure 3:
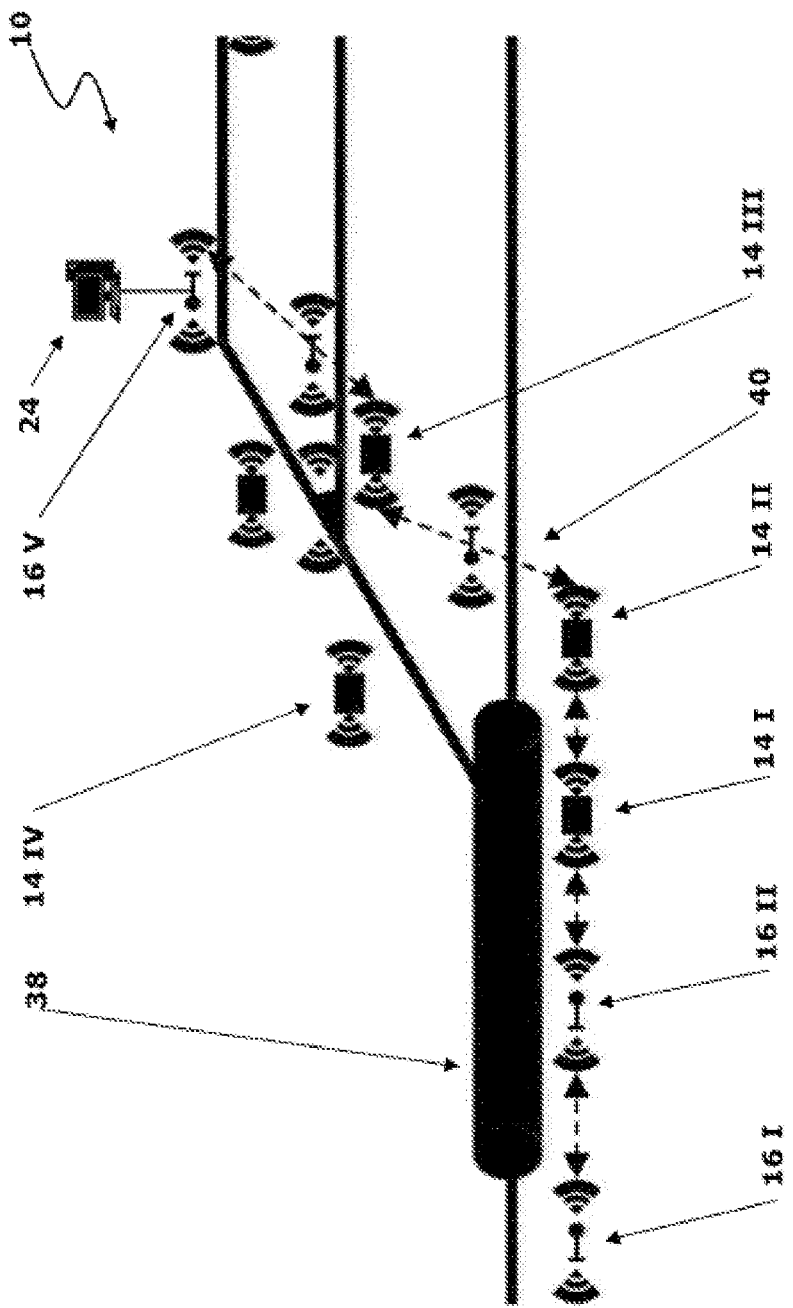
Figure 4:
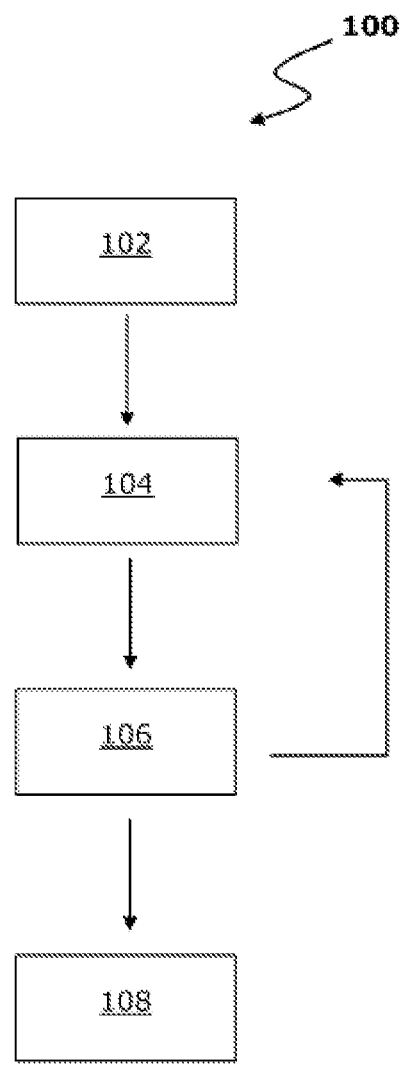

FIG. 1 is a schematic view of a data transmission system inside a rail-bound traffic system;

FIG. 2 shows a determined transmission path between a first field element and a control unit inside the data transmission system from FIG. 1;

FIG. 3 shows an alternative transmission path as a result of a disruption in the transmission path from FIG. 2;

FIG. 4 shows a method according to the invention for determining a transmission path along available field elements.

DETAILED DESCRIPTION OF THE PREFERRED EMBODIMENTS

FIG. 1 is a schematic view of a data transmission system 10 having field elements 12 in the form of axle counters 14 I-V, in the form of signals 16 I-V and in the form of points 18 I-II of a rail-bound traffic system 1 (for reasons of clarity, only one field element 12 is provided with a reference sign). The field elements 12 are arranged along rails 20 and are used to monitor rail traffic. A field element 12, in particular the signal 16 V, is connected to a control unit 24 via a data line 22.

The field elements 12 each have a communication unit 26 for wireless communication with adjacent field elements 12. Field elements 12 are considered to be adjacent if the signal ranges 28 of the field elements 12 are sufficient for communication with the respective other field element 12 in a disruption-free state. In the case of communication units 26 of identical design, the signal range 28 can deviate due to external conditions, in particular the landscape and/or buildings.

According to FIG. 1, the axle counter 14 V has a signal range 30 V that allows communication with the signal 16 V, the signal 16 IV, the signal 16 III, the point 18 I, the axle counter 14 III and the axle counter 14 IV.

The axle counter 14 IV has a signal range of 30 IV that allows communication with the axle counter 14 V, point 18 I, point 18 II, signal 16 II and axle counter 14 I.

The signal 16 I only has a signal range 32 I that allows communication with the signal 16 II.

Analogous to this, the signal ranges 28 of all field elements 12 allow communication with field elements 12 located within the signal ranges 28.

Consequently, there is a superimposition of different signal ranges 28 inside the data transmission system 10, which allows a large number of communication paths between the field elements 12.

To determine the adjacent field elements 12, an availability query is transmitted to all surrounding field elements 12. Field elements 12 that receive such an availability query send feedback to the output field element 12 of the availability query and at the same time forward the availability query to surrounding field elements 12 across their signal range 28. This procedure is carried out until no new available field elements 12 respond to the availability query and at least one field element 12 has confirmed the availability of the control unit 24 via the data line 22.

FIG. 2 is a schematic view of the data transmission system 10 from FIG. 1. On the basis of the available field elements 12 determined by the availability query, the signal 16 I, but in particular all field elements 12, determines at least one transmission path 36 to the control unit 24 along available field elements 16 II, 14 IV, 14 V and 16 V, the transmission path 36 running between the signal 16 V and control unit 24 via the data line 22.

FIG. 3 is a schematic view of the data transmission system 10 from FIG. 1, a temporary disturbance 38 in the form of a train interfering with the determined transmission path 36 (see FIG. 2) of the signal 16 I between the signal 16 II and the axle counter 14 IV.

The disturbance is reported back to the signal 16 I by the signal 16 II located immediately upstream of the disturbance in the transmission path 36 (see FIG. 2). In this case, the signal 16 I can access another alternative transmission path 40 determined as part of the availability query and transmit the data to the control unit 24 along the alternative transmission path 40 via the field elements (in this case: 16 II, 14 I, 14 II, 14 III and 16 V).

If only a single determined transmission path 36 is present, provision can be made for an alternative transmission path to be determined along available field elements 12 during the data transmission process. In particular, the signal 16 I can send a further availability query in order to determine the updated availability of the field elements 12 during the disruption that is occurring in order to determine an undisrupted transmission path to the control unit 24.

FIG. 4 shows the transmission path determination 100 of a transmission path as part of the method according to the invention for data transmission from a sender field element to a control unit along available field elements.

In a first method step 102, a sender field element sends an availability query to surrounding field elements. In a method step 104, field elements reached by the availability query respond to the sender field element directly and/or indirectly by returning availability information. Field elements not reached by the availability query therefore do not respond to the availability query and are considered unavailable.

In a further method step 106, the availability query is forwarded from the field elements that have been reached to their surroundings, and method step 104 is repeated. The availability information is returned to the sender field element indirectly via the field elements that forwarded the availability query.

Method steps 106 and 104 are repeated until no new availability information is returned to the sender field element and the availability (reachability) of the control unit has been confirmed for at least one field element.

Then, in a method step 108, the sender field element determines a transmission path along available field elements and stores this for use in forthcoming data transmissions.

In the event of a disruption during the data transmission and/or due to the expiry of the validity, in particular due to the expiry of a validity period, of the determined transmission path, provision can be made for transmission path determination 100 to be carried out again automatically, beginning with method step 102.

When all the figures of the drawing are viewed together, the invention relates to a method for data transmission inside a rail-bound traffic system 1 consisting of a plurality of field elements 12, in which the data transmission takes place via a flexible wireless transmission path 36, 40 between a sender field element 16 I and a control unit 24 along available field elements 12. Furthermore, the invention relates to a data transmission system 10 for application of the method and a rail-bound traffic system 1 having such a data transmission system 10. Furthermore, the invention relates to the use of communication units 26 on field elements 12 of a rail-bound traffic system 1 to form the data transmission system 10.

BIBLIOGRAPHY

[1] SIGNAL+DRAHT (110); Edition December 2018; pages 12 ff.; Article: Intelligenter Weichenantrieb [English: Intelligent Point Drive];
[2] CN 102063796 A: Intelligent traffic control system and method based on wireless mesh ad hoc network;
[3] Wayside Train Separation; Lineside Electronic Unit LEU-2G; Ansaldo STS
[4] "A Study on the Development of the Train Control System Data Transmission Technology Using a Wireless Mesh;"
[5] "UWB, Multi-sensors and Wifi-Mesh based precision positioning for urban rail traffic."

LIST OF REFERENCE SIGNS rail-bound traffic system 1;
data transmission system 10;
field elements 12;
axle counter 14 I-V;
signals 16 I-V;
points 18 I-II;
rails 20;
data line 22;
control unit 24;
communication unit 26;
signal range 28;
signal range 30 V;
signal range 30 IV;
signal range 32 I;
transmission path 36;
intermittent disruption 38;
alternative transmission path 40;
transmission path determination 100;
method step 102;
method step 104;
method step 106;
method step 108.

What is claimed is:

1. A method for data transmission inside a rail-bound traffic system, the method comprising the steps of:

providing a first field element having a first communication unit, where the first field element is disposed along a railway at a first location;
providing a second field element having a second communication unit, where the second field element is disposed along the railway at a second location;
providing a third field element having a third communication unit, where the third field element is disposed along the railway at a third location;
providing a control unit of the rail-bound traffic system having a fourth communication unit, where the control unit is disposed at a fourth location;
the data being transmitted wirelessly between the communication units of the field elements;
wirelessly sending an availability query from the first field element to either the second or the third field element;
receiving the availability query by either the second or the third field element, and if receiving the availability query, forwarding the availability query to the control unit;
receiving the availability query by the control unit from either the second or the third field element, and if receiving the availability query, sending back a response query to the second or the third field element;
receiving the response query by either the second or the third field element, and if receiving the response query, forwarding the response query to the first field element;
receiving the response query by the first field element from either the second or the third field element;
determining from the response query, by the first field element or the first communication unit, a beginning transmission path between the first field element and either the second or the third field element based upon the availability of the second and the third field elements; and
sending the data transmission along the beginning transmission path between the first field element and either the second or the third field element;
wherein a subsequent transmission path is configured to reach the control unit of the rail-bound traffic system;
wherein an entire transmission path between the first field element and the control unit comprises the beginning transmission path and the subsequent transmission path; and
wherein the subsequent transmission path is unknown by the first field element.

2. The method according to claim 1, wherein an ad hoc network is set up for data transmission between the field elements.

3. The method according to claim 1, wherein the single transmission path is determined for each data transmission.

4. The method according to claim 1, wherein, during the data transmission, the availability of the field elements is checked at regular time intervals, and the single transmission path is changed if one of the field elements over which the previously single transmission path runs is no longer available.

5. The method according to claim 4, wherein the first field element determines the availability of adjacent field elements by receiving status messages and/or by means of the signal strength of the other field elements, field elements being considered to be adjacent if the signal ranges of the field elements are sufficient for communication with the respective other field element in a disruption-free state.

6. The method according to claim 1, wherein the first and all field elements are designed to receive instructions.

7. The method according to claim 1, wherein the status, being diagnostic data, of the first field element is transmitted to the control unit by means of the data transmission.

8. The method according to claim 1, wherein only the field elements located on the transmission path communicate with one another for data transmission.

9. A data transmission system of the rail-bound traffic system for carrying out the method according to claim 1, having the first field element and the first communication unit, the second field element and the second communication unit, the third field element and the third communication unit, and the control unit and the fourth communication unit.

10. The transmission system according to claim 9, wherein the communication units are configured to set up an ad hoc network.

11. The transmission system according to claim 10, wherein at least one of the communication units has an interface that is designed to transmit information from the field element, being diagnostic data, to the communication unit.

12. The transmission system according to claim 11, wherein the interface is designed to transmit information being control instructions, from the communication unit to the field element.

13. The transmission system according to claim 12, wherein at least one of the communication units is designed to be supplied with energy via an energy supply of an associated field element.

14. A rail-bound traffic system having the data transmission system according to claim 9.

15. The transmission system according to claim 1, wherein the beginning transmission path between the first field element and either the second or the third field element includes a time-limited validity, wherein after the time-limited validity has expired, a second availability query from the first field element to either the second or the third field element is wirelessly sent and the method repeated.

* * * * *